United States Patent [19]

Salamander

[11] 4,273,351
[45] Jun. 16, 1981

[54] MULTIPURPOSE TRAILER

[76] Inventor: Michael G. Salamander, 16 Dunsbach Ferry Rd., R.D. #, Cohoes, N.Y. 12047

[21] Appl. No.: 59,558

[22] Filed: Jul. 20, 1979

[51] Int. Cl.³ .............................................. B60P 3/10
[52] U.S. Cl. ................................. 280/414 R; 280/789; 296/159
[58] Field of Search ................ 9/1.2; 280/789, 414 R; 296/10, 159, 168, 157, 161

[56] References Cited

U.S. PATENT DOCUMENTS

| 2,513,411 | 7/1950 | Hegl | 296/161 X |
| 3,282,603 | 11/1966 | Barth | 280/789 |
| 3,945,521 | 3/1976 | Decker | 280/414 R X |
| 3,989,265 | 11/1976 | Smiley | 280/414 R |
| 3,993,324 | 11/1976 | Carrick | 280/414 R |
| 4,103,926 | 8/1978 | Johnston et al. | 280/414 R |
| 4,133,577 | 1/1979 | Pilant | 280/414 R X |

Primary Examiner—John J. Love
Assistant Examiner—Norman L. Stack

[57] ABSTRACT

Discloses a multipurpose trailer towed by a motor vehicle comprising a fixed, flat-bed platform carried by a tubular steel frame of a wheeled undercarriage. The flat-bed platform is the basic unit that can be utilized as a flat-bed trailer and that can be converted for use as a boat trailer, tent trailer, utility or box trailer, and for mounting and transporting motorcycles and snowmobiles.

1 Claim, 10 Drawing Figures

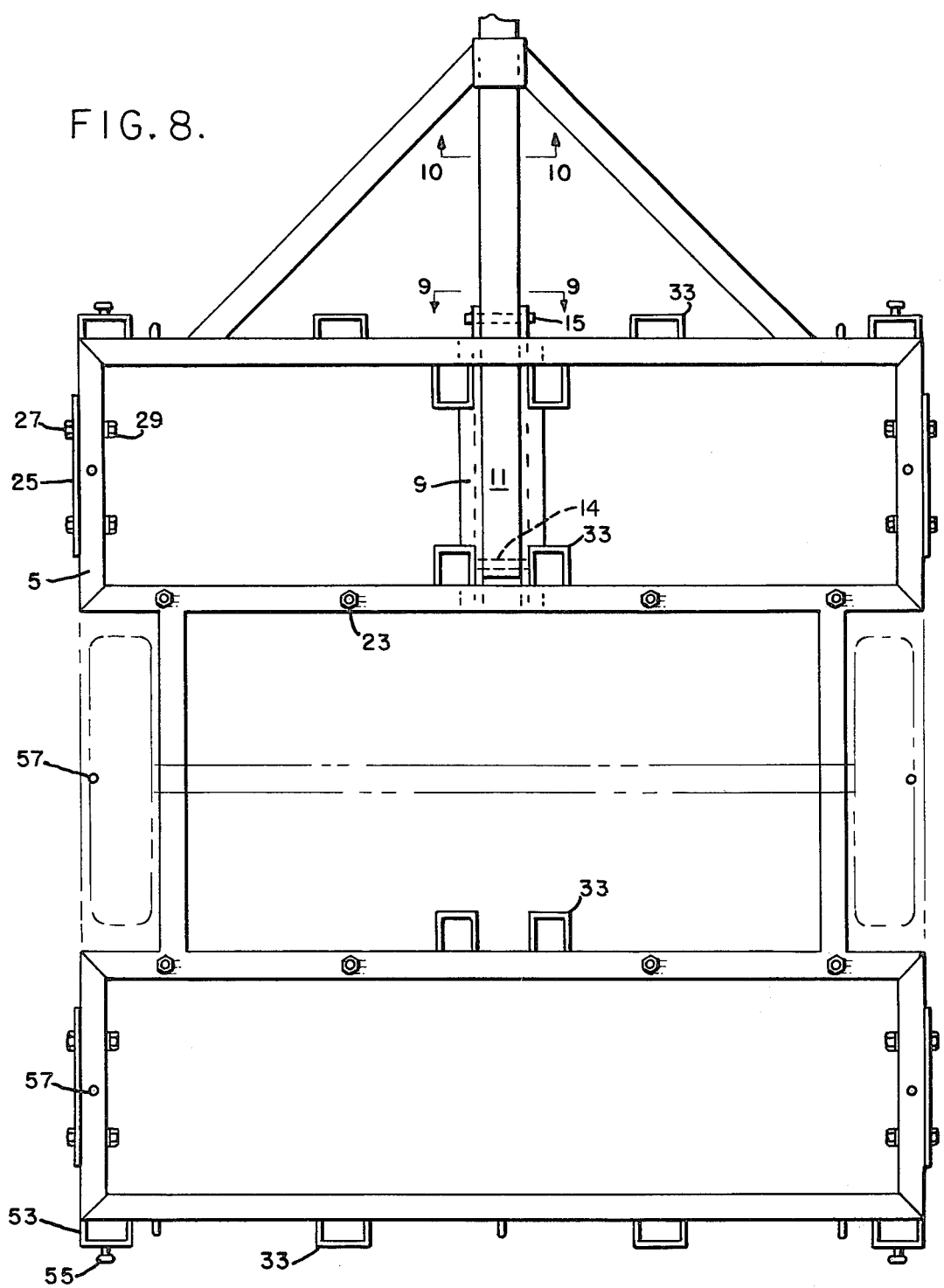
FIG. 8.
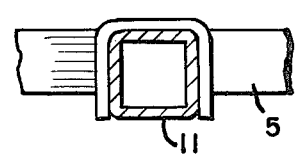
FIG. 9.
FIG. 10.

MULTIPURPOSE TRAILER

BRIEF SUMMARY OF THE INVENTION

This invention relates to the field of trailers towed by motor vehicles. The object of the invention is to provide a multipurpose trailer that can be used as a flat-bed trailer and can easily be converted for use as a boat trailer, as a tent trailer, as a utility or box trailer, and for mounting and transporting motorcycles and snowmobiles. This invention is in the form of a fixed, flat-bed platform carried by a tubular steel frame of a wheeled undercarriage. The flat-bed platform remains fixed as such and constitutes the basic unit respecting which, from which and into which are converted the other uses. A winch, keel-roller assemblies and bunker-type cradles permit conversion of the basic trailer unit for use in raising a boat onto such trailer, securing and mounting such boat, and lowering such boat from the trailer. Tent frames and a tent permit conversion of the basic trailer unit for use as a tent trailer. Side-forming and end forming members mounted vertically upstanding on the trailer permit conversion of the basic trailer unit for use as a utility or box trailer. Motorcycles can be mounted and transported by introducing their front wheels into open wheel wells and securing the motorcycles by hold-down straps to the motorcycles and eye-bolts carried by the trailer. Snowmobiles can be mounted an transported by disposing hold-down bars in securing relationship with the snowmobile skis and hold-down plates carried by the trailer.

BRIEF DESCRIPTION OF THE DRAWINGS

This object and other objects of the invention should be discerned and appreciated by reference to the detailed description taken in conjunction with the drawings, wherein like reference numerals refer to similar parts throughout the several views, in which:

FIG. 8 is a view of the trailer shown in FIG. 1;

FIG. 9 is a sectional view taken along the line 9—9 in FIG. 8; and

FIG. 10 is a sectional view taken along the line 10—10 in FIG. 8.

DETAILED DESCRIPTION

Figure 1:
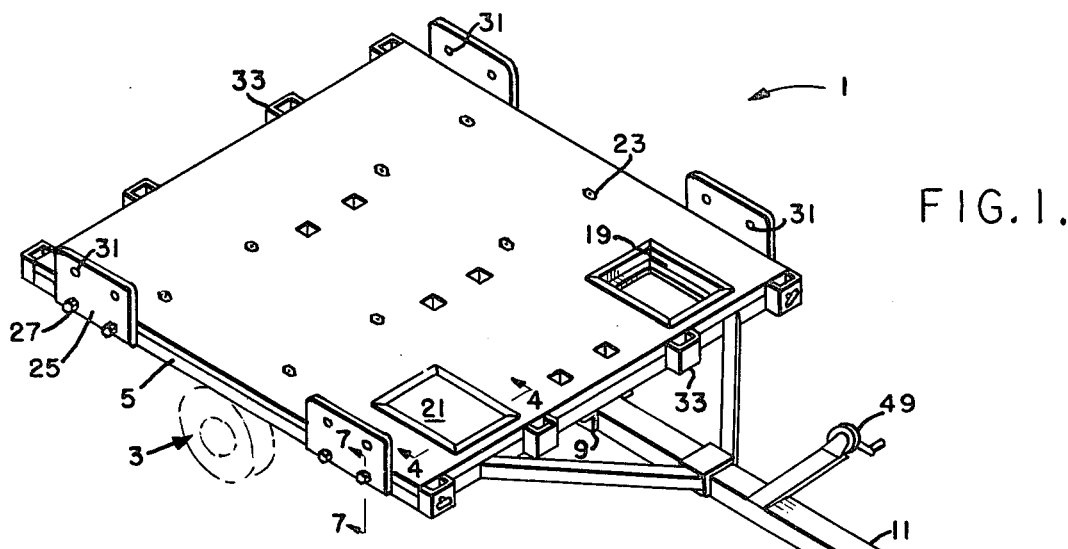
FIG. 1 is a perspective view of the invention.
Figure 2:
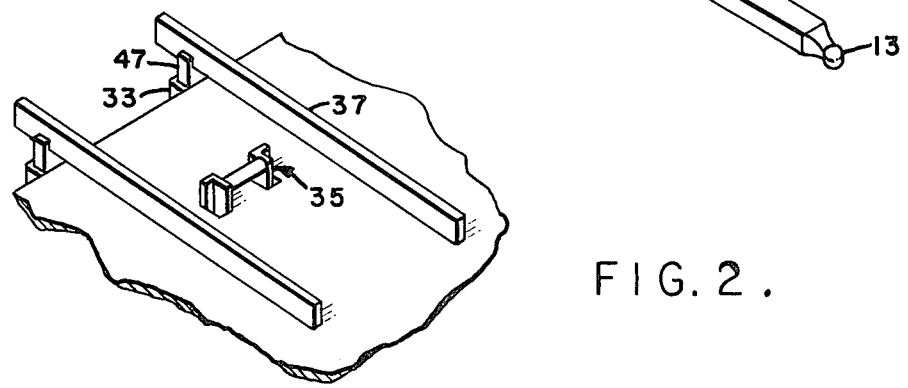
FIG. 2 is a view showing the trailer converted for use as a boat trailer.
Figure 3:
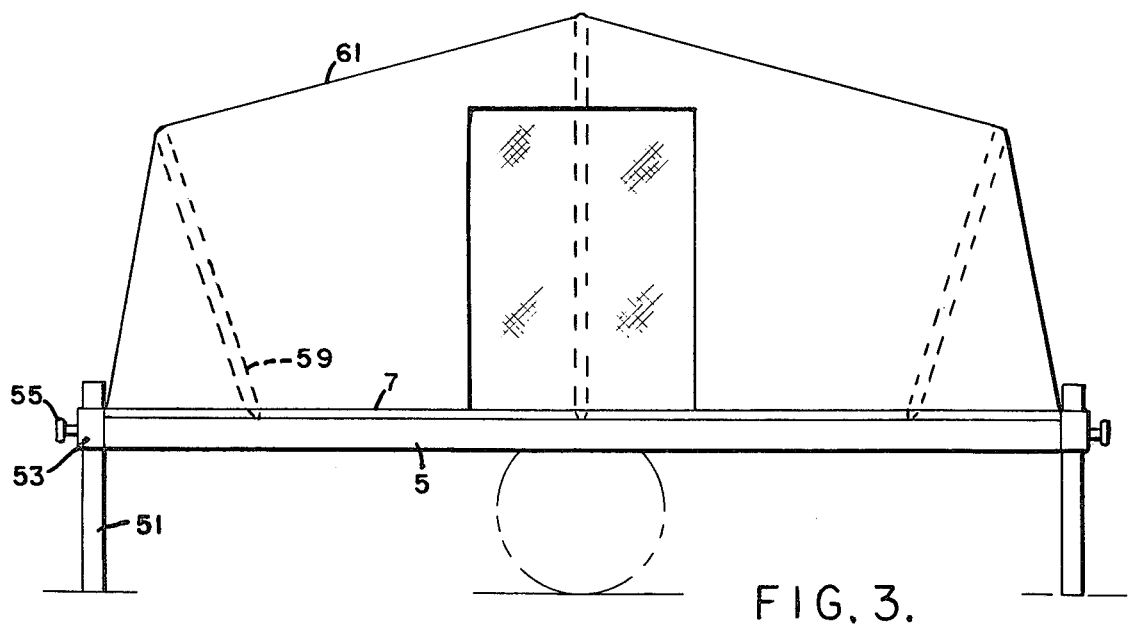
FIG. 3 is a view showing the trailer converted for use as a tent trailer.
Figure 4:
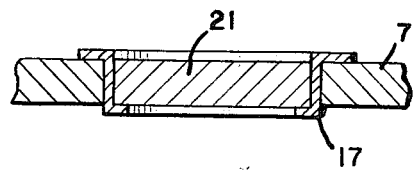
FIG. 4 is a sectional view taken along the lines 4—4 in FIG. 1.
Figure 5:
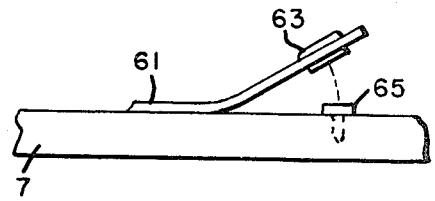
FIG. 5 is a view showing the feature of male-female snaps for securing the tent to the trailer platform.

In FIG. 1 of the drawings, reference numeral 1 generally refers to the invention which includes a wheeled undercarriage 3 whose tubular steel frame 5 carries a fixed, flat-bed platform 7.

Frame 5 has a stabilizing frame support 9 which complementally receives therein drawbar 11 at whose end is a coupler or hitch 13 for connection with a motor vehicle for towing purposes. Frame support 9 pivotally mounts drawbar 11 at its other end by means of a crosspin 14 disposed through aligned holes formed through frame support 9 and drawbar 11 to permit wheeled undercarriage 3 to tilt upwards to facilitate loading of a boat, motorcycle, snowmobile, etc. onto platform 7. Drawbar 11 is removably fixed to frame support 9 by means of a crosspin 15 disposed through aligned holes formed through frame support 9 and drawbar 11.

Formed in platform 7 by means of zees 17 are wheel wells 19, one of which is shown covered with a cover plate 21. In mounting a motorcycle, cover plate 21 would be removed and the front wheel of the motorcycle would be appropriately disposed in open wheel well 19. Appropriately fixed to frame 5 are nuts 23 for engagement by eye-bolts (not shown) that carry hold-down straps for appropriate securement with the mounted motorcycle.

Hold-down plates 25 are fixed to frame 5 by bolts 27 disposed through aligned holes formed in plates 25 and frame 5 and engaged by nuts 29. Hold-down plates 25 have aligned holes 31 for mounting hold-down bars (not shown) appropriately disposed in securing relationship with the skis of a snowmobile to thereby mount such snowmobile.

Trailer 1 can easily be converted for use as a utility or box trailer by providing vertically upstanding side-forming and end-forming members (not shown). Holes 31 of hold-down plates 25 are utilized to bolt thereto such side-forming members and the stakes of such end-forming members are received complementally in sockets or brackets 33 with which frame 5 is provided.

Figure 6:
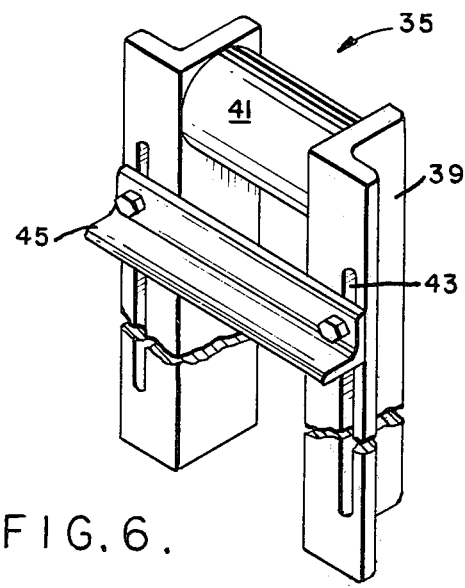
FIG. 6 is a perspective view of the keel-roller assembly.
Figure 7:
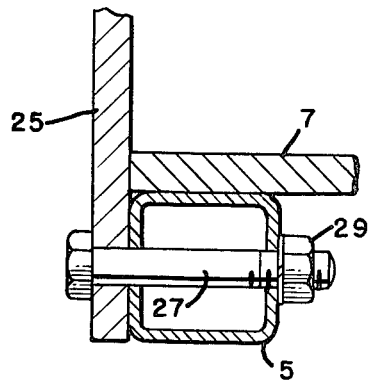
FIG. 7 is a sectional view taken along the line 7—7 in FIG. 1.

Trailer 1 can easily be converted for use as a boat trailer by providing keel-roller assemblies 35 and bunker-type cradles 37. As viewed in FIG. 6, a keel-roller assembly has side walls in the form of angles 39 carrying a transversely disposed shaft (not shown) freely mounting a keel-roller 41. Side walls 39 have elongated slots 43 formed therethrough which permit another angle 45 to be adjustably bolted thereto. Side walls 39 are appropriately disposed in brackets 33 with which the frame 5 is likewise provided in the central part of the trailer 1. Angle 45 will lie upon the flat-bed platform 7; and, hence, appropriate adjustment of angle 45 relative to side walls 39 will correspondingly raise or lower keel-roller 41. The bunker-type cradles 37 have depending stake-type legs 47 received in brackets 33. A winch 49 is provided along drawbar 11 for providing a cable for raising a boat onto trailer 1, securing same to trailer 1, and for lowering same from trailer 1. In raising a boat onto trailer 1, crosspin 15 is removed and platform 7 is appropriately tilted upward. The boat is winched onto platform 7 with its keel traveling upon keel-rollers 41 until the hull of such boat is supported by the bunker-type cradles 37, and then crosspin 15 is replaced. From the description of raising a boat onto trailer 1, the operation of lowering such boat from trailer 1 should be obvious.

Trailer 1 can easily be converted for use as a tent trailer. First platform 7 is appropriately leveled by vertical disposition of leveling legs 51. For this purpose there are four corner sockets or brackets 53 at the corners with which frame 5 is provided. Corner brackets 53 have transverse tapped holes engaged by locking screws 55 which lock levelling legs 51 in their adjusted dispositions. Formed in frame 5 are frame-support sockets or brackets 57 which receive in mounting relationship the ends of tent frames 59 and thereby mount tent frames 59, as shown. Tent frames 59 form and provide the mounting structure for tent 61. The bottom portions of tent 61 are removably secured to platform 7 by engaged male-female interference snaps, each of which has a female portion 63 carried by tent 61 and a male portion 65 fixed to platform 7.

I claim:

1. A multipurpose trailer for use as a flat-bed trailer and being adaptable for conversion for use as a boat trailer, for use as a tent trailer, for use as a utility or box trailer, and for mounting and transporting motorcycles or snowmobiles, said trailer having a wheeled undercarriage and a drawbar, said wheeled undercarriage having a tubular frame carrying a fixed, flat-bed platform, said tubular frame having a frame support complemenatatly receiving therein said drawbar, said frame support pivotally mounting said drawbar at its other end to permit said wheeled undercarriage to tilt upwards to facilitate loading of a boat, motorcycle or snowmobile onto said flat-bed platform, said fixed, flat-bed platform having formed therein zees constituting open wheel wells for receiving therein in disposed relationship the front wheels of motorcycles, said wheel wells when not in use receiving flat cover plates to render said flat-bed platform flat, said frame carrying hold-down plates, said hold-down plates having aligned holes for mounting hold-down bars disposed in securing relationship with the skis of a snowmobile to mount said snowmobile, said trailer being convertible for use as a utility or box trailer by vertically upstanding side-forming and end-forming members, said holes of said hold-down plates being utilized to bolt thereto said side-forming members, said end-forming members having stakes, said frame having sockets or brackets, said sockets or brackets complementally receiving in mounting relationship said stakes of said end-forming members, said trailer being convertible for use as a boat trailer by means of keel-roller assemblies and cradles, said keel-roller assemblies having side walls for mounting disposition in said frame brackets, said cradles having depending stake-type legs receivable for mounting disposition in said frame brackets, said drawbar mounting a winch for providing a cable for raising a boat onto said trailer, securing same to said trailer and lowering same from said trailer, said trailer being convertible for use as a tent trailer by said frame having corner sockets or brackets for adjustable mounting disposition of leveling legs, said platform being leveled by appropriate vertical disposition of said leveling legs, said frame having formed therein frame-support sockets or brackets for receiving in mounting relationship the end of tent frames to thereby mount same.

* * * * *